(12) United States Patent
Sarin

(10) Patent No.: US 10,769,610 B2
(45) Date of Patent: Sep. 8, 2020

(54) ALTERNATIVE SERVICE ACCESS

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 244 days.

(21) Appl. No.: 15/692,510

(22) Filed: Aug. 31, 2017

(65) Prior Publication Data

US 2019/0066078 A1  Feb. 28, 2019

(51) Int. Cl.
| | |
|---|---|
| *G06Q 20/20* | (2012.01) |
| *G06Q 20/32* | (2012.01) |
| *G06Q 20/40* | (2012.01) |
| *G06Q 20/38* | (2012.01) |
| *G07F 19/00* | (2006.01) |

(52) U.S. Cl.
CPC ......... *G06Q 20/206* (2013.01); *G06Q 20/204* (2013.01); *G06Q 20/3224* (2013.01); *G06Q 20/3227* (2013.01); *G06Q 20/388* (2013.01); *G06Q 20/38215* (2013.01); *G06Q 20/405* (2013.01); *G06Q 20/409* (2013.01); *G06Q 20/4093* (2013.01); *G06Q 20/40145* (2013.01); *G07F 19/209* (2013.01)

(58) Field of Classification Search
USPC .......................................................... 705/18
See application file for complete search history.

(56) References Cited

U.S. PATENT DOCUMENTS

| | | | |
|---|---|---|---|
| 10,176,476 B2 * | 1/2019 | Desai ..................... | G06Q 20/08 |
| 2017/0098210 A1 * | 4/2017 | Laracey ............ | G06Q 20/3224 |
| 2018/0096329 A1 * | 4/2018 | Hamilton ............ | G06Q 20/202 |

* cited by examiner

*Primary Examiner* — Garcia Ade
(74) *Attorney, Agent, or Firm* — Haynes and Boone, LLP

(57) ABSTRACT

Alternative service access with operations including determining that a system has met a plurality of criteria, including the system having a battery level below a threshold, identifying a merchant, generating an authentication token for authorizing a payment using a payment provider, and sending the authentication token to the payment provider.

20 Claims, 3 Drawing Sheets

ALTERNATIVE SERVICE ACCESS

TECHNICAL FIELD

The present disclosure generally relates to contingent functionality for when a device runs out of battery power.

BACKGROUND

As people have become more dependent on mobile smart devices and more services have moved to mobile smart devices, a need for alternative access to services when the mobile smart device is shut off has developed. For example, as mobile smart devices replace credit cards, the ability to purchase products can depend on the mobile smart device being powered. However, these devices run out of battery power all the time and will naturally cause problems for users who rely on them. A person may enter in a store and by the time he/she has gathered items for purchase, their device may have shut down due to low battery. This person would be left without the ability to conducting the purchase if he/she relied on the device for conducting purchases. Most people do not walk around with chargers to charge their device, and even if they did, finding a plug and charging one's device can be a cumbersome and time consuming process.

As such, Applicant recognizes a need for a contingent path to obtaining services normally provided by a user device in situations where the user device is off, such as when the battery is low.

DETAILED DESCRIPTION

Figure 1:
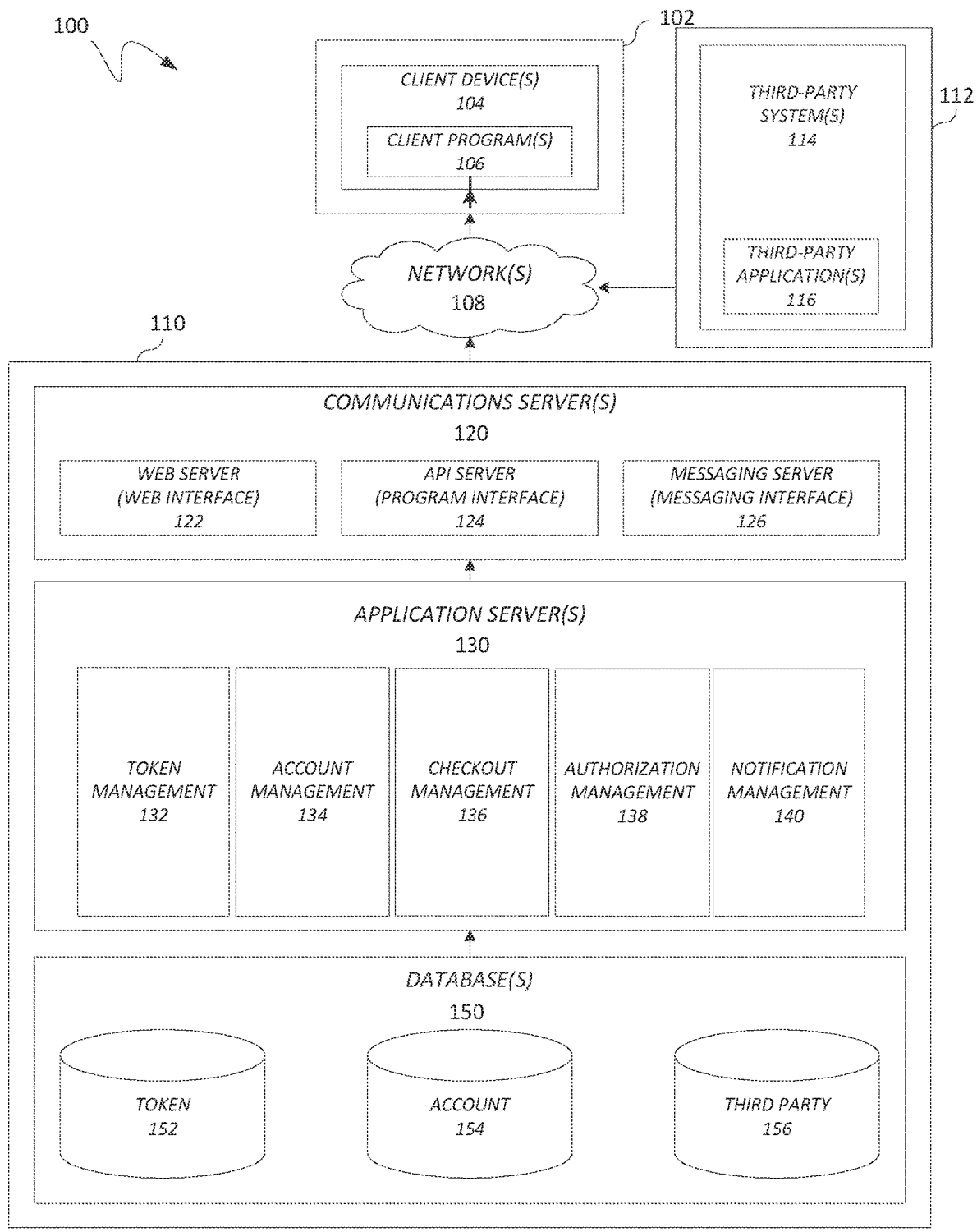
FIG. 1 is a block diagram of an example computing system that can adapted for enabling alternative service access.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

A problem and inconvenience that users come across with their user devices is running out of battery power while needing to use the device. The device may shut down due to the lack of sufficient power to run the device. For example, if a user was interested in paying for an object with their smart phone, the device usually needs to be turned on such that an application running on the device can conduct the purchase, which may be in addition to powering parts of the device, such as an antenna for NFC or a sensor for capturing biometric data. As such, the user may be stranded with the inability to conduct payments.

Some of the embodiments solve this problem by anticipating a shutdown of the user device, and in response, setting up an alternative payment method for a determined merchant. In some examples, the battery life of the user device is monitored, and in response to the battery power falling below a threshold or in response to the device triggering an automatic shutdown due to battery power, the user device may enable, generate, and/or send a token for use at one or more merchants to complete a purchase without the user device. In some examples, the system may monitor when the device is being manually turned off, put in a low battery mode, and/or the like.

In some examples of this disclosure, systems and methods preserve payment services associated with an electronic device despite the device running out of batteries (or otherwise in a mode with limited functionality) through the use of the token. The token may include information sufficient to identify a user, authenticate a user, identify a user account, complete a purchase using an account of the user, information regarding the circumstance in which the token is generated, and/or the like. In some examples, some of the information held by the token may be encrypted.

In some examples, the token may be sent, by the user device, to a payment provider and/or a merchant for future use as part of a purchase authorization, financial instrument, payment authorization, and/or the like. The payment provider system for handling purchases may authorize and enable purchases if the system determines that it has received proper identification information, such as a biometric identifier, for the account and/or token. The authorization may be predicated on one or more factors, such as matching identifier, matching merchant, unrevoked token, unexpired token (e.g. conducted within a particular time frame), correct geo location, device is limited in its functionality (e.g. turned off, low power mode, etc.), and/or the like.

In some examples, a user may provide an authenticating information, such as an identifier, short pass code, finger print, iris scan, and/or the like, through a merchant point of sales device and the information may be compared with the token by the merchant device and/or payment provider system for a match. A successful match and meeting the factors as discuss above, may allow the user to complete the purchase simply with the identifier and the electronic token. As discussed in more detail below, the token may be configured in a manner such that a system may optimize searching for the correct token when there are many tokens for comparison. Some information on the authentication information may allow for filtering the tokens to reduce the number of tokens the system searches through.

FIG. 1 illustrates, in block diagram format, an example embodiment of a computing system adapted for implementing a system for merchant item identification. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party devices 114 hosting third-party applications 116. In various implementations, third-party devices 114 and/or third-party applications 116 may host applications associated with or employed by a third party 112. For example, third-party devices 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party devices 114 and/or third-party applications 116 may also provide system 110 and/or client 102 with other information and/or services, such as email services and/or information, property transfer and/or handling, purchase services and/or information, and/or other online services and/or information.

In one embodiment, third-party devices 114 may include one or more servers and/or devices. In some embodiments, the third-party devices may include a merchandise database that can provide information regarding different items for sale, sold objections, and/or the like; a point of sales device for receiving information, such as biometric information, account information and/or the like; a wire and/or wireless communication device for communicating with user devices and/or third party devices such as a wireless beacon, NFC reader, a router, and/or the like. In yet another embodiment, third-party system 114 may include one or more servers for aggregating user data, purchase data, and other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account management, authentication, tokenization, monetary transfers, merchant identification, checkout processing, data gathering, data analysis, and other services to users that access network-based system 110. In various embodiments, client devices 104 and/or third-party devices 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party devices 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients including, but not limited to, checkout services, payment services, security, checkout processing, account management and/or the like. Application server 130 of network-based system 110 may provide services to a third-party merchants such as application creation and customization, payment processing, and/or the like. Application servers 130 may include an token management component 132, account management component 134, checkout management component 136, authorization management component 138, and/or notification management component 140. These components may come in the form of one or more servers, which may be in addition to other servers, and may be structured and arranged to configure the system enabling alternative access to a service that is ordinarily handled through a user device.

Application servers 130, in turn, may be coupled to and capable of accessing one or more databases 150 including a token database 152, an account database 154, and/or third-party database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
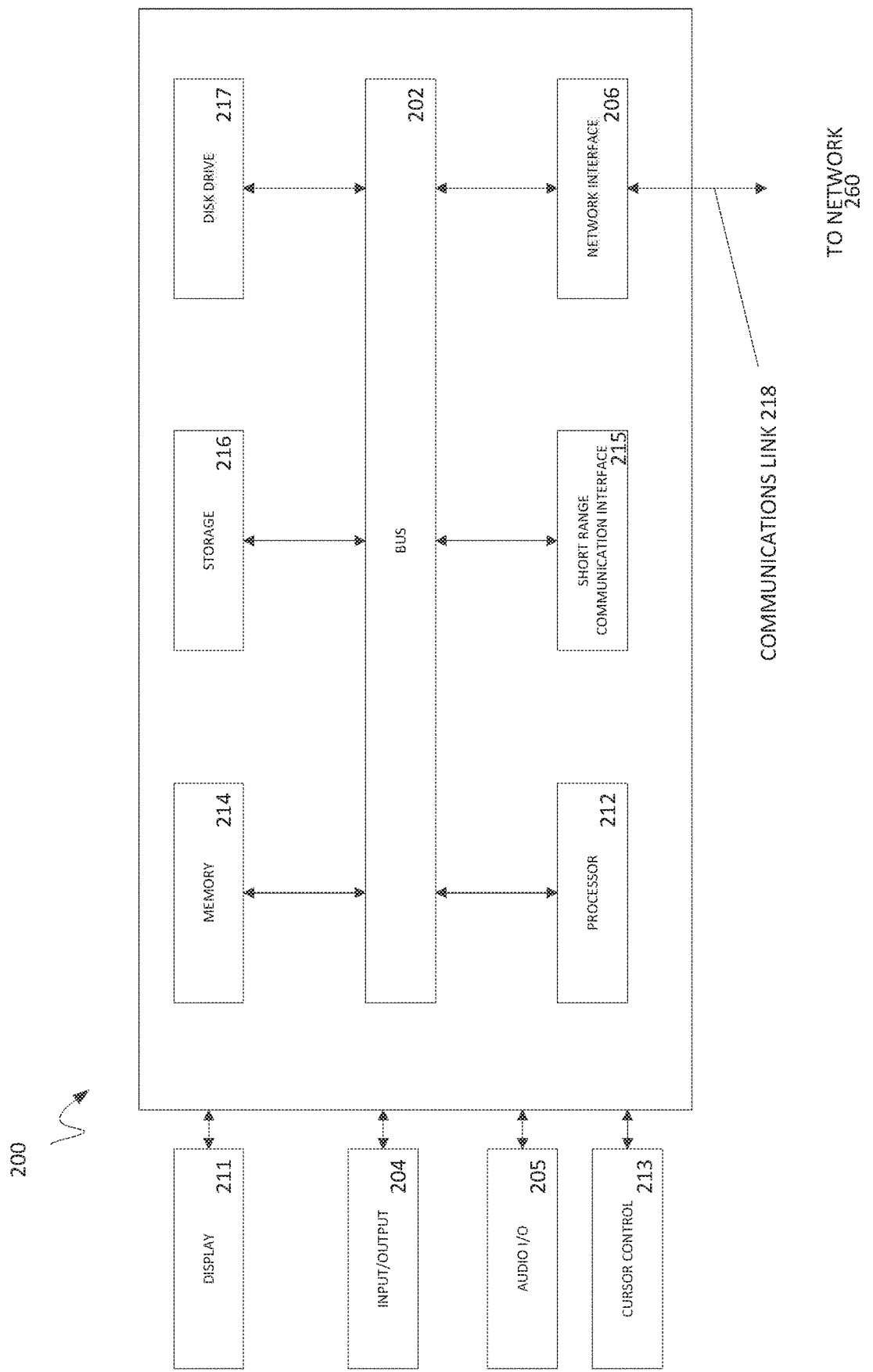
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
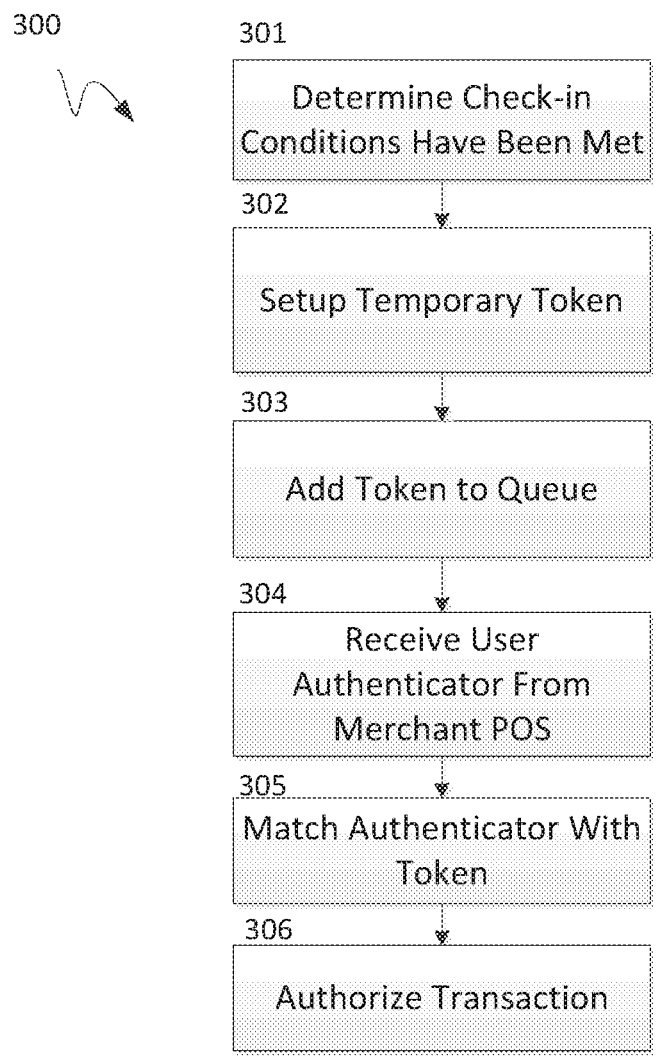
FIG. 3 is a flow diagram illustrating an example process enabling alternative checkout or other services in response to a device with restricted functionality Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

FIG. 3 illustrates example process 300 that may be implemented by a system for enabling alternative checkout or other services in response to a device with restricted functionality and/or a determination that a device will have restricted functionality. Process 300 may be implemented on a system such as system 100 of FIG. 1 according to some embodiments. According to some embodiments, process 300 may include one or more of operations 301-306, which may be implemented, at least in part, in the form of executable code stored on a non-transitory, tangible, machine readable media that, when run on one or more processors, may cause a system to perform one or more of the operations 301-304.

At operation 301, the system may monitor and determine whether a user device meets conditions for a preauthorization check-in. In some examples, the check-in may be through a user device such as a wireless communication dongle, smartphone, smartcard, smartwatch, and/or any other battery operated smart device. In some examples, an application installed on the user device may monitor the conditions and/or initiate the check-in process. The application may allow for manual and/or automatic check-in upon one or more conditions. In some examples, the one or more conditions may be that the user device be located within a certain geo-fence, be in wireless communication with one or more devices (e.g. a payment provider device, merchant device, and/or a third-party device), be within a threshold proximity of a beacon device, have a battery level/charge below a threshold level/value, user approval, a social media posting with certain pattern of words (e.g. going to store X), a voice command (e.g. create payment token for store X), and/or other conditions.

With respect to a geo-fence, an application on the user device may monitor the geolocation of the device through GPS and determine whether the GPS location is within a predetermine threshold distance from one or more GPS locations. With respect to a wireless communication condition, the user device may join and/or wirelessly communicate with a third-party device, service provider device, merchant device, token, payment provider device, and/or the like to meet the communication condition. The local area network may have one or more identifiers, digital keys, and/or the like that the user device may receive to alert the device that the communication meets one or more of the conditions. The user device may check for a matching identifier through a database lookup to ensure that the wireless communication meets the condition. In some examples, the user device may check that a communication meets a condition by sending a token through the wireless communication channel, which the device communication with the user device may relay back to the user device through an external channel, such as through a payment provider system.

With respect to the beacon proximity condition, the user device may determine that the condition is met when the user device is in close enough proximity to receive communication with the beacon. The communication may be an identifier that may identify the beacon, the location, and/or an associated entity with the location. The communication may be through an electromagnetic wireless communication, audio communication, and/or the like.

With respect to the battery level/charge condition, the user device may monitor the voltage, current, and/or power of the battery and determine whether they are below a threshold value associated with battery life. In some examples, the condition may be a shutdown event by the user device in response to low battery. In some examples, the condition may be associated with a user putting the device in low battery mode or another mode that limits the function of the user device.

With respect to user approval, the user device may request an action from the user, such as providing authenticating information (e.g. biometric identifier, username, password, pin, etc.), clicking a button, flipping a switch, providing audio commands, and/or the like. The user device may monitor sensors (e.g. finger print reader, touch screen, user interface, buttons, switches, microphones, and/or the like) to determine whether a condition is met.

In some examples, a user may set one or more of the conditions. In some examples, one or more of the conditions may be preset and/or one or more conditions may have limitations on changes. For example, a battery level condition may be set by the application distributor and/or device manufacturer. In some examples, a user may be able to change the battery level condition within a predetermined range (such as within a 1% to 10% battery life range) through an application.

In response to the predetermined conditions being met, the user device may initiate a check-in process for allowing checkout or payment with the user device turned off using a payment provider that normally limits payment through an application functioning, available, and/or running on a user device at the time of checkout.

As part of the check-in process, a temporary token may be set up at operation 302. In some examples, the token may be generated at the user device. In some examples, the user device may generate the token during certain events, such as a shutdown. In some examples, the token may be generated at a server, such as a payment provider server, in response to a request sent by the user device. The request may be sent by the user device in response to one or more conditions and/or events as discussed above. The token may include information, such as an account identifier, user identifier, payment information, credit card information, payment instrument information, authentication information (password, pin, username, biometric identifier (finger print, iris scan, voice command, etc.), token number, token key for distinguishing newly generated tokens from other tokens, merchant identifier, date/time stamp, expiration time, and/or the like), and/or the like. In some examples, the token may include information, such as the device conditions, such as the conditions discussed above in relation to operation 301. Some of the information may be held by the user device from a prior recording, such as when an application associated with the process is set up on the user device. In some examples, some of the information may be requested as part of the token generation process.

Furthermore, in some examples, the token may be revocable. In some embodiments, if one or more conditions are no longer met, the user device, merchant system, and/or service provider system may cause the token to be revoked. For example, a condition may be that the user device be shut off or have limited function. As such, if the device turns on and/or additional functions are reestablished (such as wireless communication), the user device may send a signal to the merchant and/or service provider to have a previously provided token revoked. In some examples, a token may be revoked upon determining that the user device is outside of a geo-fence. In some examples, a user may be able to manually revoke a token through a request on the user device.

In some examples, the token may also include information to enable a system to quick sort and/or search through many tokens to identify a particular token that matches certain information. In some examples, the system may be regularly searching through large number of tokens, and one or more pieces of information associated with the token may be used to reduce the number of tokens the system searches through for conducting a match. For example, the merchant may have a unique identifier. In this manner, the system may be able to reduce the searching size for matching a token to payment requests, authentications, authorization requests, and/or the like. For example, the system would be able to conduct a search or match for tokens associated with merchant 1 and ignore merchant 2 based on the merchant identifier. This would decrease the load on the system, save resources, and increase the speed of the search.

Furthermore, additional features may be used to reduce or filter the tokens to conduct a match and/or search through. For example, the system may use one or more biometric identifiers for reducing the tokens to conduct a match and/or search. Finger prints, as one form of a biometric identifier, can be categorized based on patterns. Finger prints have certain pattern types such as ulnar loops, whorls, radial loops, arches, double loops, peacock's eyes, etc. The system may categorize and provide a number and/or number identifier to the categorization and include it as part of the token information. The system may use a classifier algorithm to determine which category the biometric identifier belongs to. In this manner, the system, when searching for a particular matching finger print, the system can reduce the search size based on the type and/or determined category of finger print. This could be applied to other biometric authentications as well (e.g. skin color, eye color, hair color, gender, blood type, and/or the like. The categorization may be represented as a combination of one or more numbers and/or letters.

In some example one or more of the information included in the token may be encrypted. In some examples, the entire token may be encrypted.

At operation 303, the user device, payment provider system and/or merchant system may add the token generated at operation 302 to a queue associated with a merchant. The merchant may be determined based on, as discussed above, the geolocation of the user device, the geo-fence condition, a communication between the user device and a merchant device, communication between the user device and a beacon device, and/or the like. In some example, the merchant may be determined based on information within the token, such as a merchant identifier. The queue may include a plurality of tokens associated with other users. The queue may maintain the order in which the tokens were received. The order would be loosely related to the checkout order based on the average length of time a user takes to checkout. In this manner, the tokens can be searched in the order they were received to help reduce search time.

At operation 304, a user may checkout at a merchant device and provide an authenticator to authorize a payment with the user account. An authenticator may be a username, password, biometric identifier, and/or the like. The merchant device may be a point of sales device which may have a keypad and/or biometric identification sensor, such as a fingerprint reader. The point of sales device may additionally include one or more additional modules, such as a magnetic strip sensor, NFC sensor, and/or the like.

In some examples the merchant device may send the received authenticator to a server, such as a merchant server and/or payment system, for matching the authenticator with a token in the queue. In some examples, such as biometric authenticators, the merchant device may provide additional information, such as a merchant identifier, a category associated with the biometric identifier (e.g. a fingerprint category), and/or the like. In this manner, the system matching the authenticator with a token can reduce the number of tokens to compare the authenticator with. In some examples, the merchant device may maintain the token, and in such examples, the merchant device would conduct the matching rather than sending the authenticator to another device for that matching. In some examples, the tokens may have expirations. In such examples, the system may purge tokens that have expired.

At operation 305, the authenticator may be matched with the token received at operation 302. In some examples, the matching may be conducted by a device such as the merchant device, merchant server, service provider system, and/or the like.

The device may user information from the authenticator and/or base information received in association with the authenticator to match it with a token in the queue. In some examples, such as when the device is part of a payment system that is holding many tokens for many different merchants, the device may identify a subset of tokens to attempt to match the authenticator with. For example, the system may use the merchant and/or location of the merchant to identify the subset of tokens associated with that merchant and/or location to conduct the match. The location and/or merchant may be identified through an IP address, merchant account information, merchant identifier, and/or the like.

Furthermore, the system may further shrink the subset based on additional information, such as a classification associated with the authenticator. For example, in the case of a fingerprint used as the authenticator, the fingerprint may be categorized by type. Thus, further reducing the number of matches that the system conducts to determine if there is a matching token.

The system may further match the received authenticator with the subset of tokens to determine if there is a matching token. In some examples, the system may match the authenticator with tokens in the order that the tokens were received. In response to the system finding a matching token, the system may continue to operation 306 to authorize a transaction. In contrast, if the system does not find a matching token, the transaction may be canceled and/or communication of the failed authorizations may be communicated to the merchant and/or user through the merchant device.

At operation 306, in response to matching the authenticator with a token, the system, such as a payment system, may authorize a transaction using an account associated with the token. In some examples, the token may include account information for the system to use for conducting a funds transfer between the user account and a merchant account (e.g. account identifier, payment instrument identifier, and/or the like). The merchant device may send to the system transaction information for the system to record, which the system may provide to the user as a receipt.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, "merchant" as used herein can also include charities, individuals, and any other entity or person receiving a payment from a customer.

Furthermore, the examples above may discuss functionality that is being performed by a certain device, such as the user device, merchant device, and/or service provider device. However, some functions may be performed by another device than the device discussed in the examples. For example, instead of the user device generating a token, the merchant device and/or service provider device may generate the token.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
one of more geolocation sensors;
a non-transitory memory; and
one or more hardware processors coupled to the non-transitory memory and configured to read instructions from the non-transitory memory to cause the system to perform operations comprising:
detecting, via the one or more geolocation sensors, that the system is within a geo-fence of a merchant;
determining that a battery level of the system has dropped below a threshold; and
in response to the detecting and the determining:
generating an authentication token for authorizing a payment with the merchant using a payment provider; and
sending the authentication token to the payment provider.

2. The system of claim 1, wherein the system includes a mobile user device.

3. The system of claim 1, wherein the authentication token includes data associated with a biometric identifier.

4. The system of claim 3, wherein the authentication token can be matched with a purchase based on the biometric identifier.

5. The system of claim 1, wherein the generating and the sending are performed further in response to determining that the system is in communication with a merchant device of the merchant.

6. The system of claim 1, wherein sending the authentication token to the payment provider is completed as part of a shutdown process of the system.

7. The system of claim 1, wherein the generating and the sending are performed based at least in part on a user specified criteria.

8. A non-transitory machine-readable medium having stored thereon machine-readable instructions executable to cause a system to perform operations comprising:
detecting, via one or more geolocation sensors, that the system is within a geo-fence of a merchant;
determining that a battery level of the system has dropped below a threshold; and
in response to the detecting and the determining:
generating an authentication token for authorizing a payment with the merchant using a payment provider; and
sending the authentication token to the merchant.

9. The non-transitory machine-readable medium of claim 8, wherein the authentication token includes biometric information.

10. The non-transitory machine-readable medium of claim 9, wherein the operations further comprise requesting and receiving the biometric information from a user.

11. The non-transitory machine-readable medium of claim 10, wherein the operations further comprise analyzing the biometric information and determining a classification based on the analyzing and wherein the authentication token includes an indication of the classification.

12. The non-transitory machine-readable medium of claim 8, wherein the authentication token is revocable.

13. The non-transitory machine-readable medium of claim 12, wherein sending the authentication token is performed in response to an automated shutdown procedure.

14. The non-transitory machine-readable medium of claim 13, wherein the operations further comprise sending a revocation command for the authentication token to the merchant in response to a powering on of the system after the automated shutdown procedure.

15. A method, comprising:
   detecting, via one or more geolocation sensors, that a mobile computing device is within a geo-fence of a merchant;
   determining that a battery level of the mobile computing device has dropped below a threshold; and
   in response to the detecting and the determining:
      generating an authentication token for authorizing a payment with the merchant using a payment provider; and
      sending the authentication token to the payment provider.

16. The method of claim 15, wherein the generating and the sending are performed further in response to a determination that the mobile computing device is in electronic communication with a device of the merchant.

17. The method of claim 15, wherein the authentication token includes data associated with a biometric identifier.

18. The method of claim 17, wherein:
   the authentication token is matched with a purchase based on the biometric identifier.

19. The method of claim 15, wherein sending the authentication token to the payment provider is completed as part of a shutdown process of the mobile computing device.

20. The method of claim 15, wherein the generating and the sending are performed based at least in part on a user specified criteria.

* * * * *